Fig. 26

3,056,313
TRANSMISSION

John D. Lindsay, Birmingham, Mich., assignor to General Motors Corporation, Detroit, Mich., a corporation of Delaware Original application Nov. 28, 1958, Ser. No. 777,112. Divided and this application Nov. 13, 1959, Ser. No. 852,659

12 Claims. (Cl. 74—752)

This is a division of my application, S.N. 777,112, filed November 28, 1958, the complete disclosure of which is incorporated by reference herein.

This invention relates to transmissions of the type in which a hydraulic torque transmitting device drives change-speed gearing which drives an output shaft at a plurality of forward speed ratios, and in reverse. It relates to novel features of construction and arrangement of the change-speed gear; to novel features of the connection between the change-speed gear and the hydrodynamic torque-transmitting device; and to novel features of the hydraulic system for controlling the transmission. The transmission is particularly, though not exclusively, adapted for motor vehicle drives.

One of the objects of the invention is to provide a transmission in which various drive ratios are established by fluid actuated clutches and to vary the clutch actuating pressure in accordance with the speed of the vehicle. More particularly it is an object to provide one means for increasing clutch pressure as car speed increases and to provide another means which decreases clutch pressure as car speed increases and to provide means for selecting between these increasing and decreasing pressure according to whichever is greater.

Still more specifically it is an object to provide a clutch pressure which increases with car speed in one particular speed ratio and during overrun, that is while the car is driving the engine, and to decrease the clutch pressure a car speed increases in other speed ratios or in conditions in which the car does not drive the engine.

Figure 1:
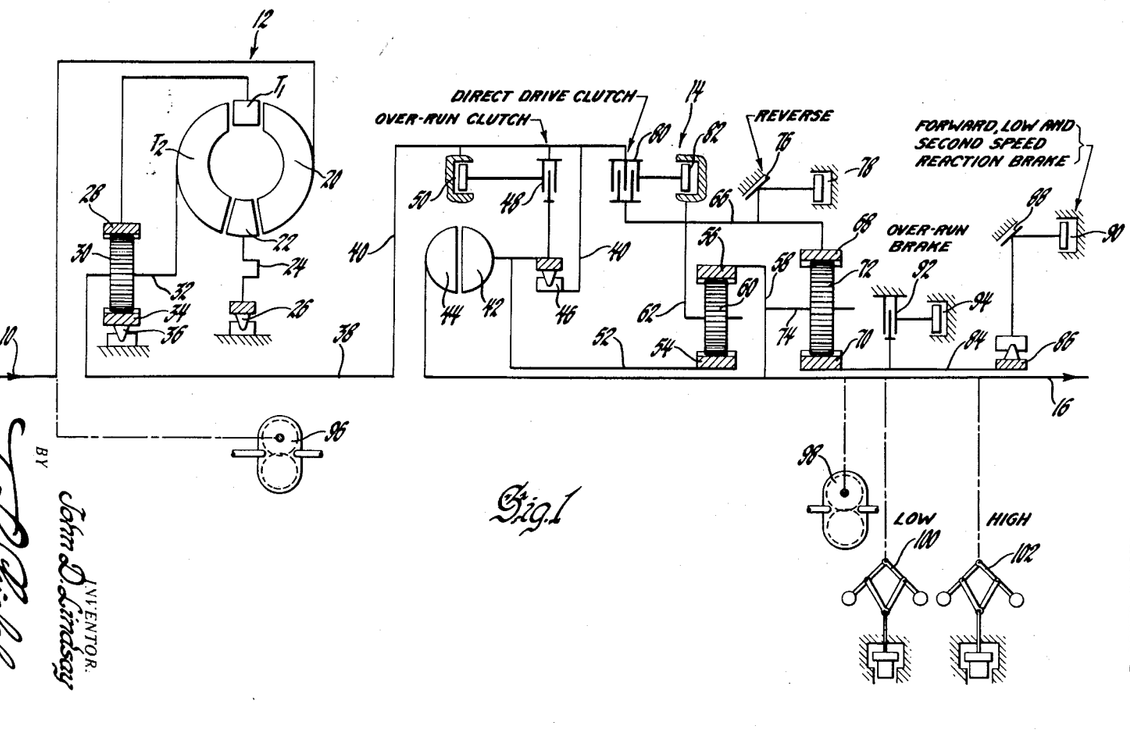
FIG. 1 is one-half of a schematic substantially symmetrical longitudinal section showing the functional relationship of the elements of a transmission embodying one form of the invention, FIGS. 2, 2a, 2b, and 2c, when put together in numerical order from left to right, collectively form a functional diagram of one form of hydraulic system for controlling the transmission shown in FIG. 1 with the control set for low range, with the engine idling.

Referring to FIG. 1 the transmission input or driving shaft 10, which may be the crankshaft of the usual internal combustion engine, drives a hydrodynamic torque-transmitting device 12 which in turn drives change-speed gearing 14 which drives an output shaft 16 which may be the propeller shaft of a conventional automobile. The hydrodynamic torque-transmitting device may be, for example, a torque converter as disclosed in British Patent 770,599, published March 20, 1957, the disclosure of which is incorporated herein by reference. In this example the torque converter has an impeller 20 driven by the engine shaft 10, a first turbine $T_1$ and a second turbine $T_2$ through which the torque transfer fluid is successively circulated, and a reaction element, stator or guide wheel 22, the blade angles of which may be adjusted by any suitable mechanism 24, and which is connected to the frame of the transmission by a one-way brake 26 which permits the stator to rotate forward but prevents it rotating backward as is known in the art. The first turbine drives the input or ring gear 28 of a planetary gear set having planet gears 30 mounted on a carrier 32, and having a reaction sun gear 34 which is connected to the frame of a transmission by a one-way brake 36 which permits the sun gear to rotate forward but prevents it rotating backward as is known. The second turbine $T_2$ is connected through the carrier 32 to the torque converter output shaft 38 which forms the input or driving shaft for the gearing 14. The arrangement is such that the torque converter 12 transmits torque to the converter output shaft 38 at a ratio in respect to the torque on the input shaft 10, which ratio varies with the load on the output shaft 38. That is, when the shaft 38 is stationary or rotating at low speed which indicates high load, the torque ratio between shaft 38 and shaft 10 is high and may be of the order of five-to-one, whereas when the speed of the shaft 38 approaches the speed of the shaft 10 due to a decrease in load on the shaft 38, the torque ratio is near unity.

Shaft 38 is connected to a housing 40 which contains a fluid coupling including a turbine 44 connected to the output shaft 16 and an impeller connected by a hollow shaft 52 to a sun gear 54. The housing and the coupling may be selectively filled with oil or emptied to make the coupling effective or ineffective as will be explained. The housing 40 is connected to the sun gear by a one-way clutch 46 to drive the sun gear forward, but permit the sun gear to overrun or rotate forward faster than the housing 40. The housing 40 may be also connected to the sun gear by an anti-overrun clutch 48 which may be engaged by a hydraulic cylinder 50 to prevent the sun gear from overrunning. The purpose of this arrangement is to use the one-way clutch 46 to transmit the heavy driving torque from the torque converter to the sun gear and use the light clutch 48 to prevent free wheeling when the input to the gearing is through the sun gear, as it is in low forward speed and in reverse, and to let the sun gear 54 rotate forward faster than the housing 40 when the input to the gearing is not through the sun gear 54. Preferably the clutch 48 is small and capable of transmitting only a light torque, much less than the torque required to drive the car through the one-way clutch 46.

The input sun gear 54 is part of a front planetary gear set which includes a ring gear 56 connected by a flange 58 to the output shaft 16, and includes planet gears 60 meshing with the sun gear 54 and ring gear 56 and mounted on a carrier 62 which is connected by a drum 66 to the ring gear 68 of a second or rear planetary gear set. The rear gear set includes a reaction sun gear 70 and planet gears 72 meshing with the ring gear 68 and sun gear 70 and mounted on a carrier 74 which is connected to the flange 58 attached to the output shaft 16. The drum 66, front carrier 62 and the rear ring gear 68 may be held fast to establish reverse drive by friction member 76 which can be grounded by a cylinder 78. This friction device in this particular usage frequently or usually has been called a reverse clutch by engineers and manufacturers, but others have questioned the desirability of calling this device a clutch and seemed to prefer to call it a brake. This has been confusing to engineers who have been confining the term brake to something that stops the car and have been using the term clutch to refer to something that drives it. I use the term friction torque-establishing device to refer both to friction clutches and to friction brakes.

Alternatively, the drum 66, carrier 62 and ring gear 68 may be connected to the fluid coupling housing 40 and to the input shaft 38 by a direct drive clutch 80 which may be set by a hydraulic cylinder 82. The rear reaction sun gear 70 is connected by a hollow shaft 84 through a one-way torque-establishing device 86 to a forward reaction torque-establishing device 88 which may be set by a hydraulic cylinder 90. This provides reaction torque for forward drive, as will be explained. Free-wheeling may be prevented by an over-run torque-establishing device 92 connected to the shaft 84, and settable by any suitable hydraulic cylinder 94.

Any suitable oil pump such as front pump 96 may be driven by the engine shaft 10 to provide a source of oil under pressure in response to rotation of the engine, for operating the controls of the transmission. Another oil pump 98 called the rear pump is driven by the output shaft 16 to provide a source of oil under pressure responsive to forward movement of the car. A low speed governor valve 100 and a high speed governor valve 102 may also be driven by an output shaft 16.

To establish low or first speed drive between the torque converter output shaft 38 and the final drive shaft 16, the overrun torque-establishing device 48 is set, the forward reaction torque-establishing device 88 is set, the overrun torque-establishing device 92 is set, the direct drive torque-establishing device 80 and the reverse torque-establishing device 76 are released, and the fluid coupling 42—44 is emptied. The input shaft 38, through casing 40, one-way clutch 46 and shaft 52 drives the front input sun gear 54 at a speed, with relation to the speed of the engine shaft 10, that is determined by the torque converter 12. Initial resistance to movement of the car holds the shaft 16 stationary which temporarily holds the front ring gear 56 stationary to act as a reaction gear for the front planetary gear set. This causes the front carrier 62 to exert forward torque on the rear ring gear 68 and this exerts reverse torque on the sun gear 70 and forward torque on the carrier 74 and output shaft 16. Because the one-way clutch 86 and the forward reaction torque-establishing device 88 prevents reverse rotation of the sun gear 70, this drives the output shaft 16 forward at a reduced speed which takes advantage of the speed reductions effected by both the front and rear planetary gear sets. The over-run torque-establishing devices 48 and 92 prevent the car from freewheeling when the car tends to run faster than the engine would drive it.

To set the gearing in second or intermediate speed, which for the purposes of this invention is a high speed, the overrun torque-establishing device 48 is released, fluid coupling 42—44 is emptied, the direct drive torque-establishing device 80 is set, the reverse torque-establishing device 76 is released, the overrun torque-establishing device 92 is set, and the forward reaction torque-establishing device 88 is set. The gearing input shaft 38 now drives the rear ring gear 68 through the casing of the fluid coupling 40, the direct drive torque-establishing device 80 and the drum 66. The rear reaction sun gear 70 is held against reverse rotation by the torque-establishing devices 86 and 88 as in low speed and this drives the carrier 74 and output shaft 16 at a speed reduction determined by the ratio of the rear planetary gear set 68—72—70, alone. The one-way clutch 46 lets the front sun gear 54 run faster than the casing 40 and carrier 62 and this lets the front planetary gear set 56—60—54 idle. Free-wheeling on overrun is prevented by the torque-establishing device 92.

Provision is made for a third speed which is another high speed having a one-to-one or direct drive with the input torque divided between mechanical drive and fluid drive. To establish third speed the fluid coupling 42—44 is filled, the overrun torque-establishing device 48 is released, the direct drive torque-establishing device 80 is engaged, the reverse torque-establishing device 76 is released, the overrun torque-establishing device 92 is released, and the forward reaction torque-establishing device 88 remains engaged but inactive, allowing sun gear 70 to turn forward, because of one-way device 86.

This drives the front carrier 62 by direct mechanical connection to the input shaft 38, the carrier now being the input member of the front planetary gear set. This gear set impresses forward torque on both the ring gear 56 and the sun gear 54, which latter through fluid coupling 42—44 impresses its torque on the output shaft 16.

Thus the output shaft 16 is driven substantially at the speed of the input shaft 38, and the torque from the shaft 38 is divided by the front gearset into a mechanical component through ring gear 56 and a hydraulic component through sun gear 34. The ratio of the components is established by the ratio of the number of teeth in the ring gear to the number of teeth in the sun gear, the proportion through the sun gear being the smaller, as is known. Since the ring gear 56 and the turbine 44 necessarily turn at the speed of the shaft 16, and the sun gear 54 runs faster than the ring gear 56, the sun gear drives the impeller 42 faster than the speed of the casing 40, as permitted by the one-way clutch 46.

For reverse drive the overrun torque-establishing device, 48, the direct drive torque-establishing device 80, the overrun torque-establishing device 92 and the forward reaction torque-establishing device 88 are all released, the fluid coupling 42—44 is emptied, and reverse torque-establishing device 76 is set. The torque converter output shaft 38 now drives the shaft 52 through the one-way clutch 46, and because the torque-establishing device 76 holds the carrier 62, the sun gear 54 drives the ring gear 56 backward which drives the output shaft 16 backward at low speed ratio.

*Control System*

As more fully disclosed in the parent application, in general, the control system includes the front and rear pumps 96 and 98 which constitute reservoirs or sources of control oil under pressure whenever the engine is running or the car is moving forward; a manually operated selector valve which determines whether the transmission will drive the car forward or backward, and if forward, whether it will be held in first speed, or will be permitted to upshift automatically to one high speed or to second speed only or to two high speeds which are second and third speeds; a pump pressure regulator which normally maintains a constant pump pressure but which can be influenced by various modifiers or modulators to change the pressure as may be required by different driving conditions; a clutch shift valve for selectively setting or releasing the direct drive clutch 48; a fluid coupling shift valve for selectively filling and emptying the fluid coupling; a stator control valve for placing the stator blades in either high or low angle; and various relay, blocker or inhibitor valves which permit or prevent operation of other elements of the control system in accordance with the requirements of automatic and manual gear ratio selection. The shift valves are urged to shift up by governor-generated pressure as the speed of the car increases and are urged to shift down by pressure representing torque or power demand as indicated by throttle opening.

Figure 2:
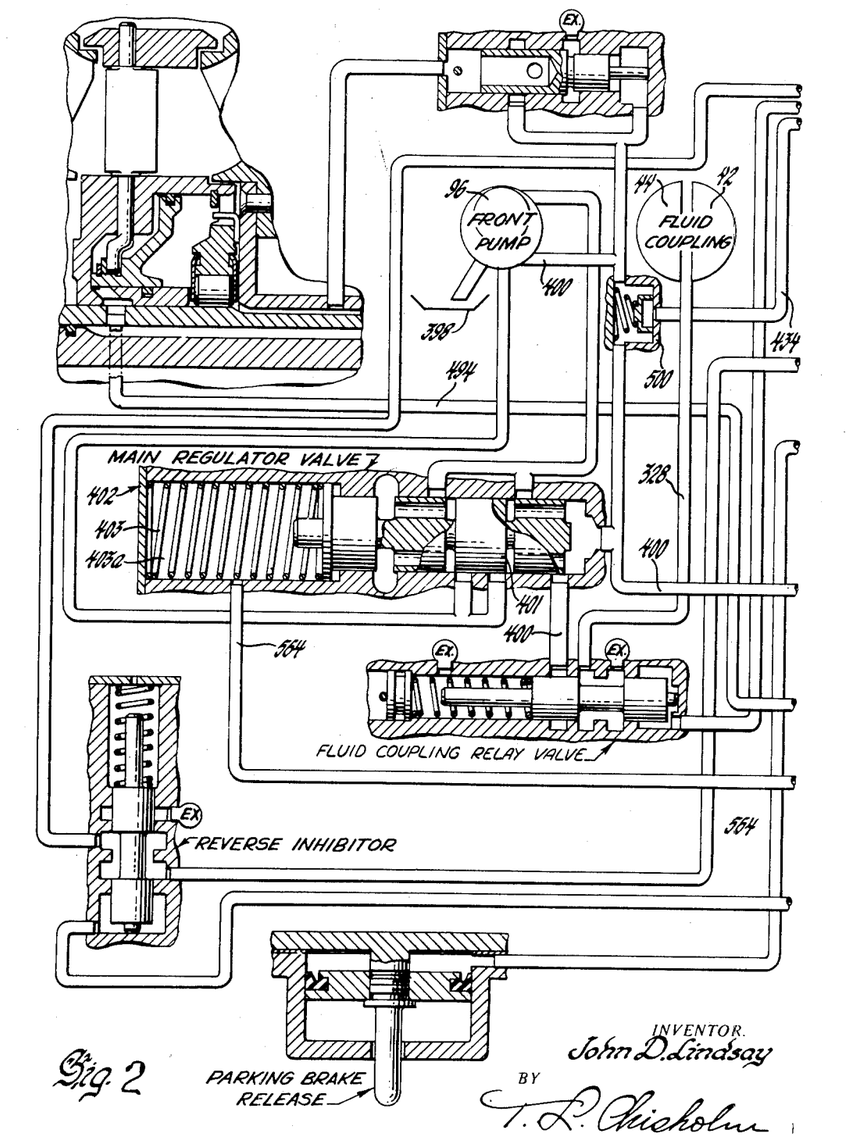
Figure 2A:
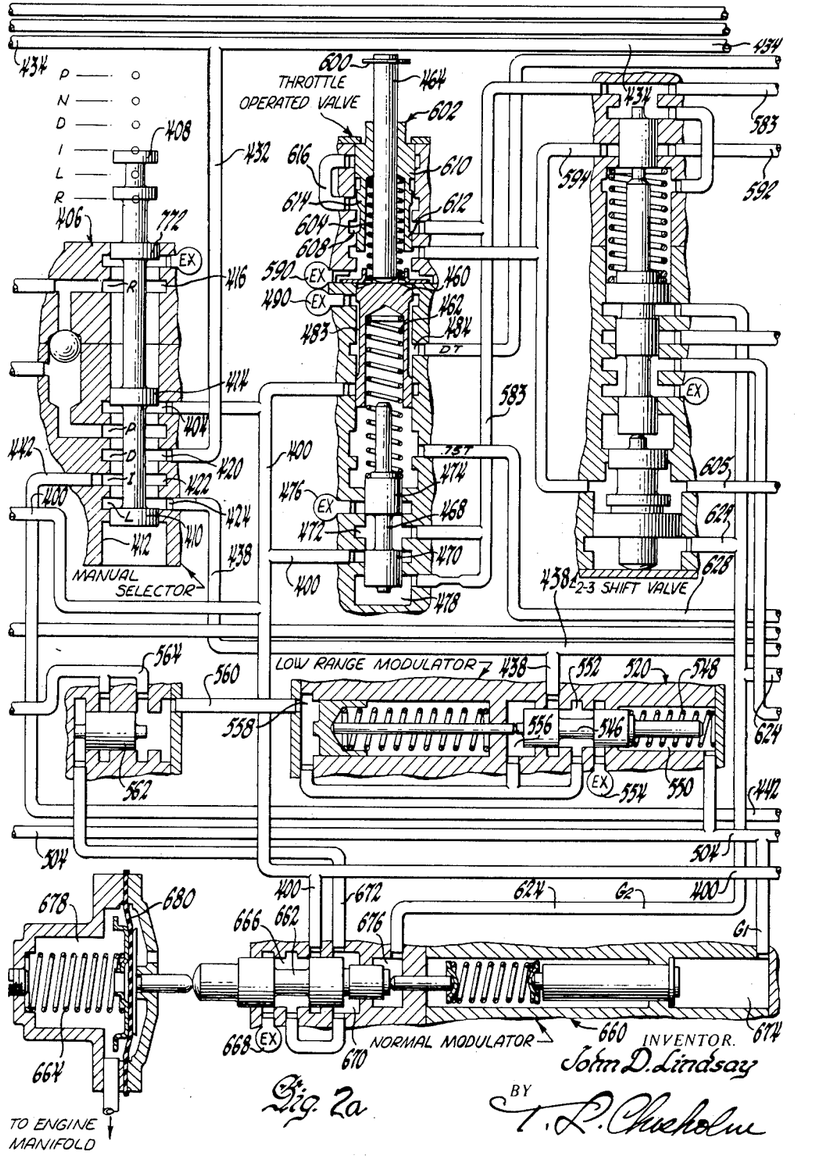
Figure 2C:
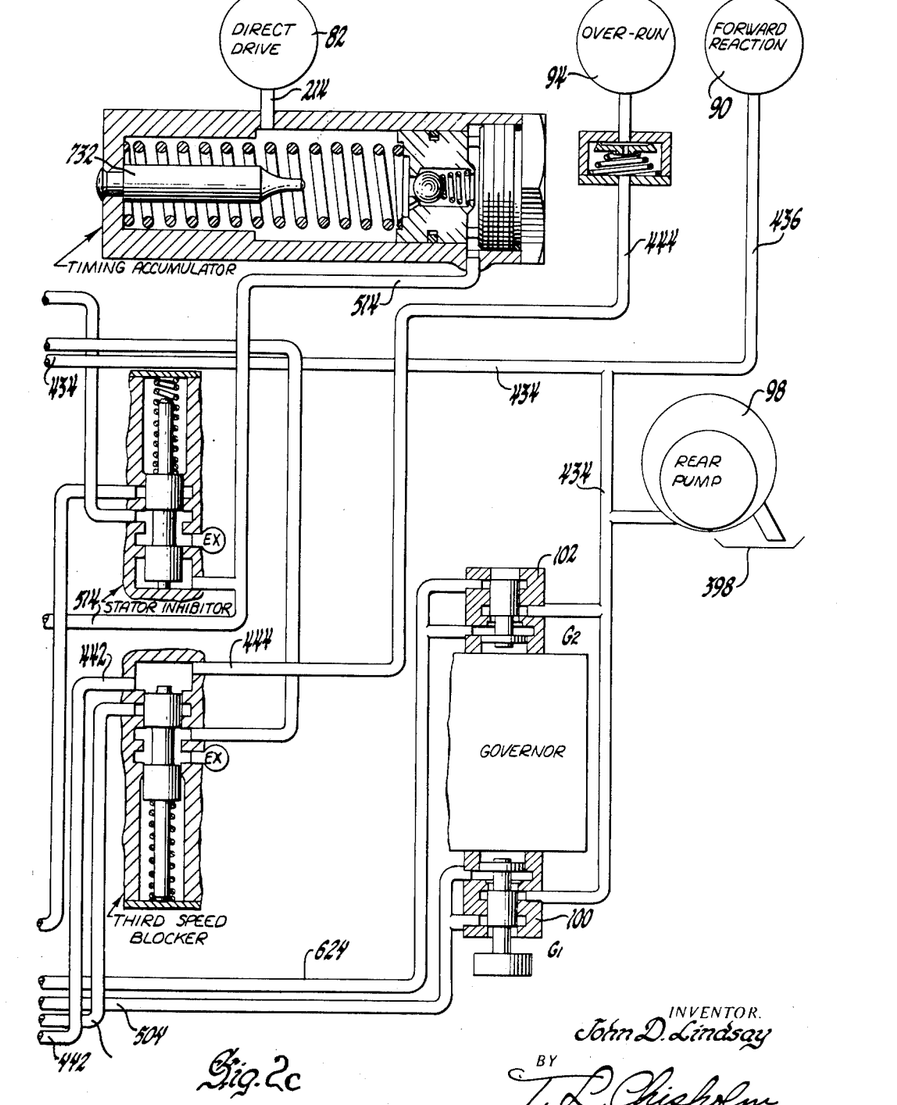

Referring to FIGS. 2 thru 2c, the front pump 96 takes in oil from a sump 398, customarily formed by a portion of the transmission casing 116, and discharges oil under pressure to a main line 400. The pressure of the main line urges to the left, as seen in FIG. 2 the valve stem 401 of a pressure regulator valve generally designated by 402, against the force of a return spring 403 in a pressure chamber 403a. As known (and for example as disclosed in the Herndon Patent 2,763,162) this arrangement maintains a constant pressure in the main line 400 when there is a constant pressure or no pressure in the chamber 403a, but the pressure of the main line can be changed by changing the pressure in the chamber 403a.

Assume that the engine is idling with closed throttle and that the car is standing. The main line 400 is connected to the line port 404 of the manual valve, generally designated 406 (FIG. 2a) having a valve stem 408. When this valve stem is in the L or low range position shown its lowermost land 410 blocks the exhaust port formed by the open end 412 of the manual valve 406 and its central land 414 separates the main line port 404 from the reverse port 416. Main line pressure is supplied to the drive range port 420, the intermediate range port 422 and the low range port 424. The rear pump 98 at this time is not operating. Oil from drive port 420 is conducted by line 432, rear pump discharge line 434, and line 436 to the cylinder 90 (FIG. 2c) to set the forward reaction torque-establishing device 88, which, therefore, in any forward drive position of the manual valve prevents reverse rotation of the rear reaction sun gear 70 through the one-way clutch 86 and permits the establishment of first and second speed drives. Oil from the low port 424 of the manual valve 406 is conducted by lines 438 and 440 to the cylinder 50 which sets the overrun clutch 48. Oil is conducted from the intermediate port 422 by conduits 442 and 444 to the cylinder 94 to set the overrun torque-establishing device 92.

Having set the forward reaction torque-establishing device 88, the overrun torque-establishing device 92 and the overrun clutch 48 the gearing is conditioned for drive in low gear, as explained above, whenever the throttle is subsequently opened.

The control system includes a throttle valve 460 normally urged closed, or up, as seen in FIG. 2a by a spring 462 and which can be opened against the force of the spring by a plunger 464 moved downward by any suitable means, not shown, connected to the mechanism which operates the throttle of the engine. The spring 462 also urges downward as FIG. 2a is seen, a throttle regulator valve 468 having a land 470 which controls communication between the main line 400 and a regulated pressure chamber 472, and a land 474 which controls communication between the regulated pressure chamber and an exhaust port 476. The regulated pressure chamber 472 is connected to a pressure regulating chamber 478. The spring 462 urges the valve 468 down against the pressure in the chamber 478 and this maintains in the regulated pressure chamber 472 a pressure measured by the force of the spring 462, which in turn is measured by the amount of throttle opening, as is known. The pressure in chamber 472 is called T.V. pressure herein. This pressure is used to control the shaft valves.

The rear pump discharge conduit 434 is supplied with oil at main line pressure from the drive port 420 on the manual valve 406, and this supplies both governor valves 100 and 102 as shown in FIG. 2c until the rear pump 98, begins to deliver oil at sufficient pressure, in response to motion of the car. When this occurs both front and rear pumps supply the control system, and at a predetermined speed of the car at which there is a predetermined pressure in the line 400 supplied by both pumps, pressure of the front pump is reduced by the main regulator valve 402 and the front pump idles, as is known. At this time the rear pump alone supplies the control system, the check valve 500 (FIG. 2) opening to permit the oil from the rear pump to reach parts of the system formerly supplied by the front pump alone. However, the car does not usually run fast enough in first speed for the rear pump to take over, this occurring usually at about 45 m.p.h., for example.

The governor valves 100 and 102, supplied by the front pump and/or rear pump as driving conditions determine, as is known, each constitutes means for providing fluid at a pressure which is a measure of the speed of the car, the valve 100 providing a given pressure at a lower speed than the valve 102. The low speed pressure from valve 100 is called $G_1$ pressure herein and the high speed pressure from valve 102 is referred to as $G_2$ pressure herein.

As long as the manual valve is in the low range position, shown in FIG. 2a the automatic shifting mechanism cannot establish a higher gear ratio because the direct clutch chamber 82 is vented and cannot set the clutch 80, which must be set to establish either second or third speed drive. The direct clutch chamber 82 is vented by a second speed blocker valve or direct clutch blocker valve 510 which connects to exhaust port 512 the direct clutch apply line 514 which is connected to the previously described clutch passage 214. The second speed blocker 510 is held closed to vent the line 514 against the force of opening spring 516 by the pressure of oil in a closing chamber 518 which is filled at line pressure from previously described overrun clutch apply conduit 440 which is connected to main line at low port 424 of the manual valve 406 whenever the control is set for low range.

Since overrunning sometimes imposes a very heavy torque on the overrun clutches the line pressure is increased above normal to sustain this torque whenever the car is operating in low speed established by the manual valve, which is to say low range, and the increased line pressure varies according to car speed. This is accomplished by a low gear modulator valve 520 which supplies to the modulating chamber 403a of the main regulator valve 402 modulating pressure which increases as the car speed increases. The low modulator valve 520 includes a valve stem 546 urged open or to the left, as FIG. 2a is seen, by a spring 548 and by $G_1$ pressure in the chamber 550 connected to $G_1$ supply line 504 to admit oil from the low range control line 438 to a regulated pressure chamber 552. The valve stem is urged to the right to close the entry from line 438 and to open an exhaust port 554 by the pressure from regulated pressure chamber 552 acting in regulating pressure chambers 556 and 558, connected to a modulated pressure delivery line 560 connected through a shuttle valve 562 and line 564 to the chamber 403a of the main regulator valve 402. This arrangement provides a pressure in the chamber 403a which is normally determined by the spring 548 but which is increased as car speed increases. Consequently, when driving in low range the pressure in main line 400 is maintained above the normal pressure which the main pressure regulator valve would otherwise provide, and this higher pressure is further increased with increasing car speed.

The low modulator pressure valve 520 is suplied only from the low range control line 438, which line is vented at exhaust port 412 by land 410 in all positions of the manual valve except low range, so that this modulator operates only in low range.

*Intermediate Drive Range*

In order to drive the car in intermediate range, in which either first or second speed is selected automatically in accordance with driving conditions, the manual valve is placed in the "I" for intermediate position. This conditions the car for low speed drive, substantially as shown in FIGS. 2–2c because the rear pump discharge conduit 434 connected thru the manual valve 406 to the main line 400 in all drive positions fills the cylinder 90 to set the low forward reaction torque-establishing device 88 and the conduit 442 supplied from the intermediate range port 422 is connected to the conduit 444 which fills the cylinder 94 to set the overrun torque-establishing device 92. However, there is this difference between low speed drive in low range and low speed drive in an automatic range, the overrun torque-establishing device cylinder 50 is vented at low range port 424 of the manual valve in automatic range, consequently the car can overrun or freewheel in low gear if selected automatically, but cannot free-wheel in low range selected manually.

As the car increases in speed there is a tendency to shift up into second speed but the upshift is delayed if there is a high torque demand as indicated by high throttle opening. This is accomplished as follows—a direct clutch valve or 1–2 shift valve 570 can connect main line 400 to line 572 which can supply pressure to set the direct clutch through the direct clutch blocker valve or second speed blocker valve 510 which is now opened by its spring 516 (there being no pressure in closing chamber 518 because this chamber is vented through lines 440 and 438 at port 412 of manual valve 406) to connect line 572 to the direct clutch line 514 (FIG. 2b), and the shifter valve 570 can disconnect main line 400 from conduit 572 and vent conduit 572 at exhaust port 573 to vent chamber 82 (FIG. 2c) to release the clutch 80. The shifter valve 570 includes a valve stem 574 which is urged up or open to apply the clutch 80 by $G_1$ pressure in an opening chamber 576 and an opening chamber 578 which are supplied from the $G_1$ line 504. The valve stem 574 is urged down to release the direct clutch by the T.V. pressure from chamber 472 of the throttle regulator valve which is connected to closing chambers 580 and 582 by conduit 583. When the speed of the car has increased enough to make second gear drive appropriate at any particular throttle opening the force of $G_1$ pressure in chambers 576 and 578 overcomes the force of T.V. pressure in chambers 580 and 582 and the valve upshifts to connect mainline 400 to line 572 and apply the direct clutch 80 and establish second gear drive.

The transmission is automatically downshifted to first gear drive whenever torque demand increases at a given speed to the point where first gear drive is required, as indicated by the throttle opening. When this occurs T.V. pressure in chambers 580 and 582 overcomes $G_1$ pressure in chambers 576 and 578 and moves the valve stem 574 down to block main line 400 and vent conduit 572 to release the clutch.

Hunting between upshift and downshift at substantially the same speed is prevented by the hydraulic latch effected by conduit 584 and piston 586 between T.V. downshift chambers 580 and 582. Whenever the governor pressure is increasing and the car is in first gear preceding an upshift, T.V. pressure is exerted in both chambers 580 and 582 (FIG. 2b) but after the upshift the piston 586 is moved up to close the conduit 584 and connect chamber 582 to vent port 590 in the throttle valve by conduit 592 which is always connected to conduit 594. This removes the downshift force from chamber 582 and thereafter requires a higher throttle opening and higher T.V. pressure in chamber 580 alone to effect a downshift at a particular speed than is required to prevent an upshift at the same speed. Conversely, after a downshift caused by a particular throttle opening at a particular speed which is effected by T.V. pressure in the chamber 580 alone, piston 586 cuts off chamber 580 from line 592 and connects the chamber 580 to the chamber 582 through line 584, which increases the downshift force on the valve 574 and requires a greater car speed to upshift at a particular throttle opening than the speed which permitted the downshift at that throttle opening.

When in inermediate range the transmission can be downshifted to first speed manually or in response to torque demand at car speeds above the speed which would automatically downshift to first speed. This is done by pushing the throttle operating mechanism beyond full throttle opening to cause a stop 600 on the throttle valve stem 464 to depress a detent valve 602 against a spring 604 far enough to close exhaust port 590 and connect T.V. pressure line 583 to the line 594 which is always connected to the line 592 and thus pressurizes the previously vented downshift chamber 582. Line 594 also directs T.V. pressure through line 605 to a governor inhibitor chamber 606 in the 1–2 shift valve 570. At full throttle opening the T.V. pressure is high, and may substantially equal line pressure. This pressure in chamber 606 opposes $G_1$ pressure in chamber 576 and acts in downshift chambers 580 and 582. This can overcome $G_1$ pressure and move the valve 574 down to vent line 572 and place the transmission in low or first gear, or hold it in low if it has not upshifted. When the 1–2 shift valve is in the downshifted position T.V. pressure acts on total area of piston 606a to oppose upshift, so that upshift will occur at some definite car speed after forced downshift. When upshift has occurred, the small hydraulic latch piston 606b enters the small bore 606c and so cuts off T.V. pressure from the area of the small piston. This reduces the force opposing upshift and so the valve 574 is kept upshifted by governor pressure until car speed is reduced below the value at which upshift occurred. This prevents hunting. The device can be calibrated to shift down by flooring the throttle in this manner regardless of car speed. However, it is frequently undesirable to be able to place the transmission in low gear at high speed and where this is so the areas of the pistons in the 1–2 shift valve, the governor pressure $G_1$ and the T.V. pressure can all be so related that the clutch shifter valve cannot downshift above a predetermined car speed.

The valve 602 is called a detent valve because it offers an opposing force to movement of the throttle linkage past wide open position, which force is reduced after such movement is completed. It is analagous to the opposition provided by a spring poppet or detent which is sometimes used for the same purpose. This opposition by the detent valve is accomplished as follows.

During all operation from closed throttle to full throttle, T.V. pressure is always present in the space 608 surrounding the detent valve 602. Because the area of the land 610 is larger than the area of the land 612 this pressure exerts an upward force on valve 602 which assists spring 604 in opposing its movement by the throttle mechanism, which force is felt by the driver in the usual throttle foot pedal as soon as the stop 600 touches the valve 602. Consequently, the driver knows when he is about to downshift and this tends to prevent inadvertent downshift. However, as soon as the detent valve has moved enough to close vent port 590 and connect T.V. line 583 to downshift line 594, a cut-off land 614 cuts off the T.V. conduit 583 from land 610, and land 610 uncovers a passage 616 which vents pressure between lands 610 and 614 at the open end of the bore surrounding valve 602. This removal of pressure from land 610 reduces opposition to movement of the valve 602, which is felt by the driver in the pedal, so that the driver knows he has completed the movements necessary for downshifting. This is desirable when attempting to downshift at high speed.

When the car is being driven in second gear it can be placed in low by moving the manual valve 408 to the L position shown in FIG. 2a. However, it is undesirable to place the car in low by manual control if the car is moving above a predetermined speed. In order to prevent this I provide a manual low inhibitor valve 618 (FIG. 2b) normally opened by a spring 620 to connect line 438 to line 440 to pressurize the overrun torque-establishing device cylinder 50. This valve can be closed to vent cylinder 50 and the manual low control line 438 at vent port 621 by a closing cylinder 622 connected to the $G_2$ pressure line 624. The valve is closed whenever the speed of the car is above a predetermined value. If then the manual valve is moved to the low position, the overrun torque-establishing device 48 cannot be set and this prevents establishment of low gear. Although the forward reaction torque-establishing device 88 remains set, this cannot establish low gear connection between the engine and propeller shaft because the gearing input shaft 52 and the impeller 42 are rotating faster than the casing 40 and the one-way clutch 46 is running free. But, when the car speed drops to a safe predetermined value, the speed-responsive manual low inhibitor valve 618 opens to pressurize the cylinder 50 to set the over-run torque-establishing device 48' and to pressurize the closing cylinder 518 to close the second speed blocker valve 510 and vent cylinder 82 to disestablish second speed. This establishes the low gear connection.

In first speed manually selected, the direct clutch apply line 514 is vented at port 512 of the opened second speed blocker valve 510.

Under normal conditions of automatic drive, that is with the transmission above first speed, it is desirable to reduce line pressure as the speed of the car increases, because with increasing speed the load on the torque-establishing devices, such as the direct drive clutch 80, is reduced so that their torque can be sustained by a lower clutch pressure. Therefore, power is saved by reducing the pump pressure as the speed of the car increases. In order to accomplish this the pressure modulating chamber 403a of the main pressure regulator valve is supplied by a normal pressure modulator valve 660 with a pressure which decreases as car speed increases. The pressure modulator valve 660 includes a valve stem 662 urged open (toward the right as seen in FIG. 2a) by a spring 664 to admit oil from the main line 400 to a regulated pressure chamber 666 and urged closed to cut off the main line 400 and open exhaust port 668 by the regulated pressure exerted in a regulating chamber 670. As so far described this arrangement, as is known, maintains in the pressure chamber 670 a fixed pressure determined by the force of the spring 664. This pressure is conducted by lines 672 and 564 to the booster chamber 403a of regulator valve 402. When the system is first started this establishes a higher pressure in the line 400 than the transient pressure before the chamber 403a can begin to act but when the system becomes stable the arrangement so far described maintains constant pressure in the main line 400. This pressure in the main line 400 is reduced as the speed of the car increases by a pressure chamber 674 filled at $G_1$ pressure, and chamber 676 filled at $G_2$ pressure, both of which chambers urge the valve 662 to close against the spring 664 and thus reduce the pressure supplied to the booster chamber 403a. Reduction of the boost pressure reduces main line pressure. The boost pressure in chamber 403a can be increased with torque demand, if desired, by any suitable known means such as by placing the spring 664 in a chamber 678 closed by a flexible diaphragm 680 exposed to the atmosphere, the chamber being connected to the induction manifold of the internal combustion engine which drives the car.

The shuttle valve 562 directs to boost chamber 403a of the main regulator valve 402 whichever modulating pressure is higher at any moment. Since the manual low modulator valve 520 can only function when the transmission is in low range, it follows that its pressure is zero at all other times and the normal modulator prevails, moving the shuttle valve 562 to the right. Since the low range modulating valve generates a pressure which increases with car speed but does not change with torque demand, and since the normal modulating valve generates a pressure which increases with torque demand but decreases with speed, it will be possible for one or the other of the modulators to prevail, according to speed and torque conditions, when the transmission is operating in low range.

When the manual valve 408 is set for intermediate range the transmission will start in low gear and automatically shift between first and second gear as determined by car speed and throttle opening.

The description of the control mechanism for establishing neutral, reverse and third speed or direct drive is omitted here, for it is not essential to an understanding of the invention claimed in this divisional application. It is explained in the parent application, Serial Number 777,112.

I claim:

1. A power transmission comprising in combination a driving member, a driven member, a friction torque establishing device which establishes a driving connection between the members, a fluid pressure chamber which operates the friction torque establishing device, a source of pressure fluid which can be connected to the chamber, regulating means which tends to maintain the pressure of the source substantially constant, pressure-responsive modulating means which changes the pressure maintained by the regulating means, fluid pressure supply means for supplying a control pressure which is a measure of the speed of the driven member and which increases as the speed of the driven member increases, and means which connects the fluid pressure supply means to the modulating means to increase the pressure in the chamber of the friction torque establishing device by an amount measured by the speed of the driven member.

2. A power transmission comprising in combination, a driving member, a driven member, a friction torque-establishing device which establishes a driving connection between the members, a fluid pressure chamber which operates the friction torque-establishing device, a source of pressure fluid which can be connected to the chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases and means responsive to both control pressures which connects the higher of such two pressures to the modulating means to control the pressure of the source.

3. A power transmission comprising in combination, a driving member driven by an engine, a driven member, a friction torque-establishing device which establishes a driving connection between the members, a fluid pressure chamber which operates the friction torque-establishing device, a source of pressure fluid which can be connected to the chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases and increases as the torque demand on the engine increases and means responsive to both control pressures which connects the higher of such two pressures to the modulating means to control the pressure of the source.

4. A power transmission comprising in combination, a driving member, a driven member, a first torque-establishing device which establishes a high speed driving connection between the members, a second friction torque-establishing device which establishes a low speed driving connection between the members, a first fluid pressure chamber which operates the first friction torque-establishing device, a second fluid pressure chamber which operates the second friction torque-establishing device, a source of pressure fluid which can be connected to the chambers, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source and means for reducing the pressure of the first fluid pressure supply means below any value of pressure maintained by the second fluid pressure supply means whenever the low speed driving connection is interrupted.

5. A power transmission comprising in combination, a driving member, a driven member, a friction torque-establishing device which establishes a high speed driving connection between the members, a second friction torque-establishing device which establishes a low speed driving connection between the members, a fluid pressure chamber which operates the friction torque-establishing device, a source of pressure fluid which can be connected to the chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source, and means for eliminating the pressure of the first fluid pressure supply means whenever the low speed driving connection is interrupted.

6. A power transmission comprising in combination a first power member, a second power member, first torque transfer means adapted to establish a driving connection between the members by which the second member rotates at a relatively low speed with respect to the first member, a torque-establishing device which establishes torque from the first member to the second member through said first torque transfer means, a first friction torque-establishing device which establishes torque from the second member to the first member through said first torque transfer means, a first pressure chamber which operates the first friction torque-establishing device, a second torque transfer means adapted to establish a driving connection between the members in which the second member rotates at a relatively high speed with respect to the first member, a second friction torque-establishing device which establishes torque from the first member to the second member through the second torque transfer means, a second pressure chamber for operating the second friction torque-establishing device, a source of pressure adapted to be connected to each chamber, regulating means which tends to maintain the pressure of the source substantially constant, a pressure-responsive modulating means which changes the pressure maintained by the regulating means, a first fluid pressure supply means for supplying a first control pressure which increases as the speed of the second member increases, a second fluid pressure supply means for supplying a second control pressure which decreases as the speed of the second member increases, means responsive to both control pressures which connects the higher of such two pressures to the modulating means to control the pressure of the source, and means responsive to the absence of pressure in the first chamber for reducing the first control pressure below any value maintained by the second fluid pressure supply means.

7. A power transmission comprising in combination a first power member driven by an engine, a second power member, first torque transfer means adapted to establish a driving connection between the members by which the second member rotates at a relatively low speed with respect to the first member, a torque-establishing device which establishes torque from the first member to the second member through said first torque transfer means, a first friction torque-establishing device which establishes torque from the second member to the first member through said first torque transfer means, a first pressure chamber which operates the first friction torque-establishing device, second torque transfer means adapted to establish a driving connection between the members in which the second member rotates at a relatively high speed with respect to the first member, a second friction torque-establishing device which establishes torque from the first member to the second member through the second torque transfer means, a second pressure chamber for operating the second friction torque-establishing device, a source of pressure adapted to be connected to each chamber, regulating means which tends to maintain the pressure of the source substantially constant, a pressure-responsive modulating means which changes the pressure maintained by the regulating means, a first fluid pressure supply means for supplying a first control pressure which increases as the speed of the second member increases, a second fluid pressure supply means for supplying a second control pressure which decreases as the speed of the second member increases and increases as the torque demand on the engine increases, means responsive to both control pressures which connects the higher of such two pressures to the modulating means to control the pressure of the source and means responsive to the absence of pressure in the first chamber for reducing the first control pressure below any value maintained by the second fluid pressure supply means.

8. A power transmission comprising in combination, a driving member, a driven member, first torque transfer means adapted to establish a driving connection between the members by which the driven member rotates at a relatively low speed with respect to the driving member, a first friction torque-establishing device which establishes torque between the members through said first torque transfer means, a first pressure chamber which when filled with pressure fluid establishes torque in said first friction torque-establishing device and when empty interrupts torque in said first friction torque-establishing device, second torque transfer means adapted to establish a driving connection between the members in which the driven member rotates at a relatively high speed with respect to the driving member, a second friction torque-establishing device which establishes torque between the members through the second torque transfer means, a second pressure chamber which when filled with pressure fluid establishes torque in said second friction torque-establishing device and when empty interrupts torque in said second friction torque-establishing device, a source of pressure adapted to be connected to each chamber, means for selectively filling each chamber from the source and for selectively emptying each chamber, regulating means which tend to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source, and means responsive to emptying the first chamber for reducing the first control pressure below any value maintained by the second fluid pressure supply means.

9. A power transmission comprising in combination a driving member, a driven member, first torque transfer means adapted to establish a driving connection between the members by which the driven member rotates at a relatively low speed with respect to the driving member, a first friction torque-establishing device which establishes torque between the members through said first torque transfer means, a first pressure chamber which when filled with pressure fluid establishes torque in said first friction torque-establishing device and when empty interrupts torque in said first friction torque-establishing device, second torque transfer means adapted to establish a driving connection between the members in which the driven member rotates at a relatively high speed with respect to the driving member, a second friction torque-establishing device which establishes torque between the members through the second torque transfer means, a second pressure chamber which when filled with pressure fluid establishes torque in said second friction torque-establishing device and when empty interrupts torque in said second friction torque-establishing device, a source of pressure adapted to be connected to each chamber, means for selectively filling each chamber from the source and for selectively emptying each chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source, and means responsive to emptying the first chamber for eliminating the first control pressure.

10. A power transmission comprising in combination a driving member, a driven member, first torque transfer means adapted to establish a driving connection between the members by which the second member rotates at a relatively low speed with respect to the driving member, a first friction torque-establishing device which establishes torque between the members through said first torque transfer means, a first pressure chamber which when filled with fluid under pressure operates the first friction torque-establishing device, second torque transfer means adapted to establish a driving connection between the members in which the driven member rotates at a relatively high speed with respect to the driving member, a second friction torque-establishing device which establishes torque between the members through the second torque transfer means, a second pressure chamber which when filled with liquid under pressure operates the second friction torque-establishing device, a source of pressure adapted to be connected to each chamber, means for selectively filling each chamber from the source and for emptying each chamber, regulating means which tends to maintain the pressure of the chamber substantially constant, a pressure-responsive modulating chamber which when filled with liquid under pressure changes the pressure of the source in accord with the pressure in the modulating chamber, a first fluid pressure supply means connected to the source which supplies a first control pressure which increases as the speed of the driven member increases, a second fluid pressure supply means for supplying a second control pressure which decreases as the speed of the driven member increases, means responsive to both control pressures which connects the higher of such two pressures to the modulating chamber, and means responsive to emptying one of said torque-establishing chambers for interrupting connection between the source and the first fluid pressure supply means.

11. A power transmission comprising in combination a driving member, a driven member, a torque-establishing device for establishing a driving connection from the driving member to the driven member, a friction torque-establishing device for establishing a two-way connection between the members, a fluid pressure chamber which operates the friction torque-establishing device, a source of pressure fluid for connection to the chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source, and means responsive to interruption of the two-way driving connection between the driving and driven members for reducing the pressure of the first fluid pressure supply means below any value of pressure maintained by the second fluid pressure supply means.

12. A power transmission comprising in combination a driving member, a driven member, a torque-establishing device for establishing a driving connection from the driving member to the driven member, a friction torque-establishing device for establishing a two-way driving connection between the members, a fluid pressure chamber which operates the friction torque-establishing device, a source of pressure fluid for connection to the chamber, regulating means which tends to maintain the pressure of the source substantially constant, a pressure-responsive modulating means which changes the pressure maintained by the regulating means, a first fluid pressure supply means for supplying a first control pressure which increases as the speed of the driven member increases, a second fluid pressure supply means for supplying a second control pressure which decreases as the speed of the driven member increases, means responsive to both control pressures which connects the higher of such two pressures to the modulating means to control the pressure of the source, and means responsive to interruption of the two-way driving connection between the driving and driven members for eliminating the pressure of the first fluid pressure supply means.

References Cited in the file of this patent

UNITED STATES PATENTS

| | | |
|---|---|---|
| 2,711,656 | Smirl | June 28, 1955 |
| 2,732,732 | Borman | Jan. 31, 1956 |
| 2,792,716 | Christenson | May 21, 1957 |
| 2,896,478 | Winchell | July 28, 1959 |